No. 641,983. Patented Jan. 23, 1900.
A. P. MORROW.
BACK PEDALING BRAKE.
(Application filed Aug. 1, 1896. Renewed Nov. 1, 1899.)
(No Model.) 2 Sheets—Sheet 2.
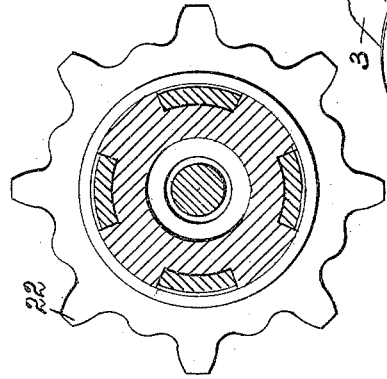
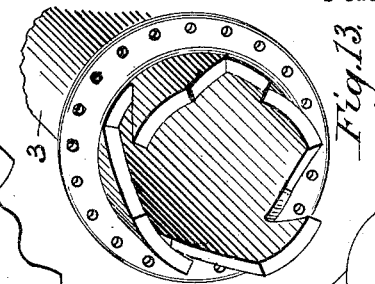
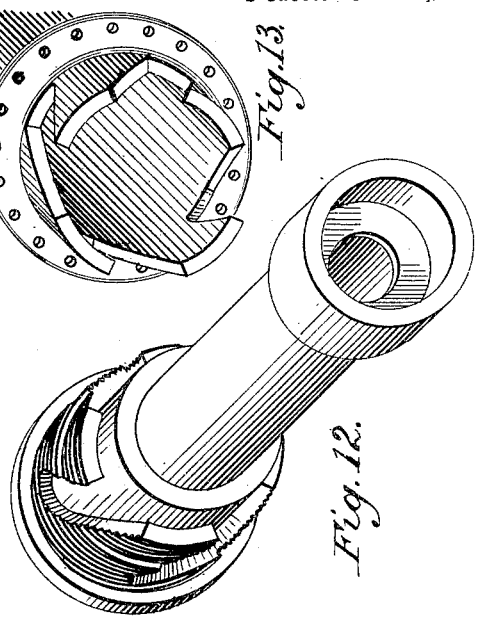
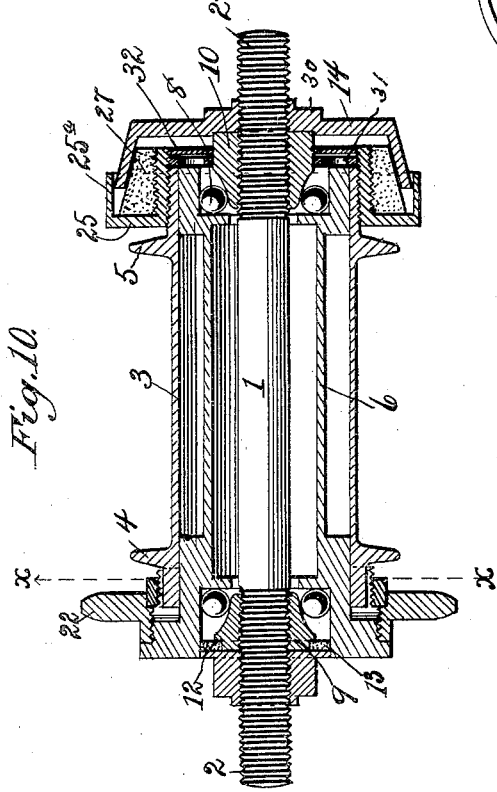
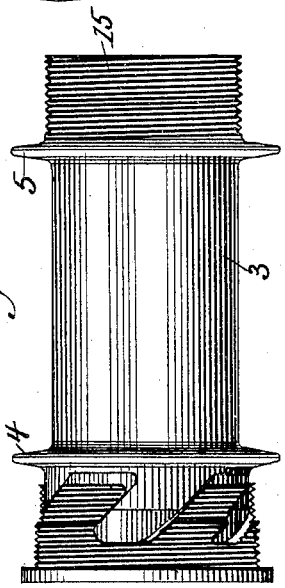
Attest:
F. H. Schott
Albert Popkins.
Inventor:
Alexander P. Morrow
by his Attorney
Jas. L. Skidmore

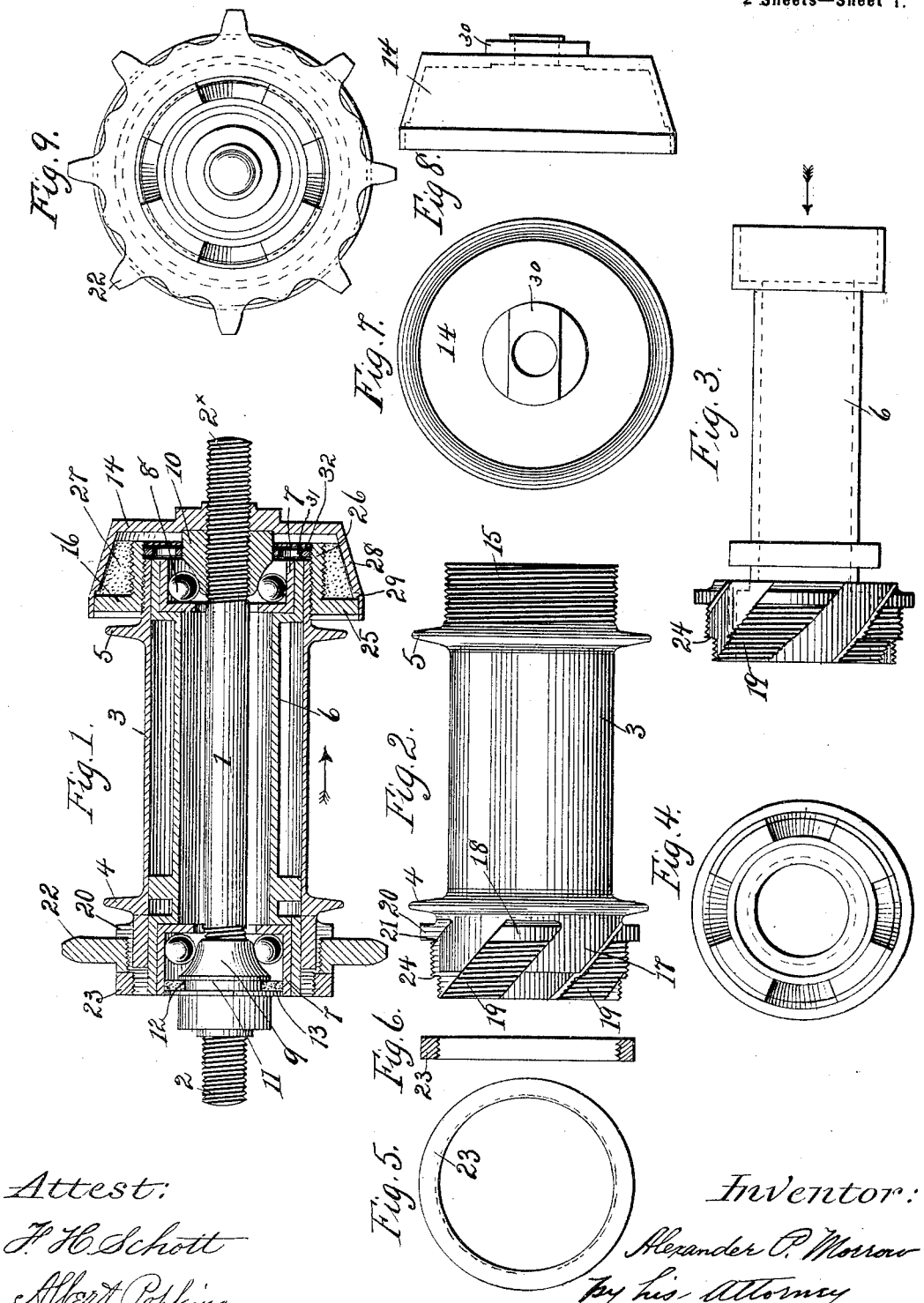

UNITED STATES PATENT OFFICE.

ALEXANDER P. MORROW, OF ELMIRA, NEW YORK, ASSIGNOR OF ONE-HALF TO HARMON H. FULTON, OF SAME PLACE.

BACK-PEDALING BRAKE.

SPECIFICATION forming part of Letters Patent No. 641,983, dated January 23, 1900.

Application filed August 1, 1896. Renewed November 1, 1899. Serial No. 735,557. (No model.)

*To all whom it may concern:*

Be it known that I, ALEXANDER P. MORROW, a citizen of the United States, residing at Elmira, in the county of Chemung and State of New York, have invented certain new and useful Improvements in Bicycle-Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to brake mechanism for bicycles or like vehicles; and its primary object is to provide novel and effective means for applying braking friction directly to the hub of the driving-wheel of the bicycle in contradistinction to employing a brake-shoe adapted to contact with the wheel-tire, which latter means of braking has been found objectionable, if not impracticable, with wheels equipped with pneumatic tires or other tires the material of which is easily abraded by the wearing contact of a brake-shoe therewith.

A further object of the invention is to avoid the use of brake-levers and to control the brake mechanism from the pedals by what is termed by bicycle-riders "back-pedaling."

The characteristic features of my invention will be fully described hereinafter and defined in the appended claims.

In the accompanying drawings, which constitute a part of this specification, Figure 1 is a central longitudinal section of the hub and axle of a bicycle driving-wheel with my improvements applied thereto. Fig. 2 is a side elevation of the wheel-hub detached and having the movable brake-sleeve arranged therein. Fig. 3 is an elevation of the brake-sleeve detached from the hub. Fig. 4 is an end view of the brake-sleeve looking in the direction of the arrow in Fig. 3. Figs. 5 and 6 are respectively a side elevation and a transverse section of the ring arranged upon the left-hand end of the brake-sleeve. Figs. 7 and 8 are respectively an end view and a side elevation of the cap secured upon the right-hand end of the axle. Fig. 9 is an end elevation of the axle and hub with the sprocket-wheel in place thereon. Fig. 10 is a central longitudinal section of a modified construction of axle, hub, and brake mechanism. Fig. 11 is a side elevation of the hub and brake-sleeve shown in Fig. 10 detached. Fig. 12 is a view in perspective of the brake-sleeve. Fig. 13 is a perspective view of one end of the wheel-hub, and Fig. 14 is a vertical section on the line $x\,x$ of Fig. 10.

The reference-numeral 1 indicates the axle, threaded at its ends 2 and $2^\times$.

3 indicates the tubular hub of the wheel, provided with the usual annular flanges 4 and 5 for the attachment of the spokes. (Not shown.)

The brake-sleeve 6 is arranged within the hub 3 and upon the axle 1, as shown in Fig. 1. Each end of the sleeve 6 is provided with an annular bearing-box 7, within which are supported ball-bearings 8 by means of conical bushings 9 and 10. The bushing 9 is internally threaded to screw upon the threaded end of the axle and is provided with an annular groove 11 and an annular shoulder 12 to receive a packing-ring 13. The conical bushing 10 projects centrally from a cap 14 at the right-hand end of the axle and is also centrally bored and threaded to fit upon the threaded end of the axle.

Referring now especially to Figs. 2, 11, and 13, the hub 3 is provided at one end with an annular extension 15, projecting beyond the flange 5 and screw-threaded to receive the flanged collar 16 of the brake mechanism. The opposite end of the hub 3 is provided with an annular extension 17, formed with a series of spiral slots 18, adapted to receive and interlock with a series of spirally-disposed teeth 19, formed upon the left-hand end of the brake-sleeve 6. An annular collar 20, formed with slots 21, coinciding with the spaces between the teeth 19, serves as a stop for the sprocket-wheel 22, which is held in place by the threaded ring 23. The spiral teeth 19 are screw-threaded for the attachment of the sprocket-wheel and ring 23, and each of said teeth is formed with a shoulder 24, said shoulders all being in the same vertical plane to constitute an annular stop for the retaining-ring 23.

The collar 16, fitting upon the threaded end 15 of the hub 3, comprises a vertical portion or flange 25 and a horizontal tubular portion 26, which latter is threaded both internally and externally, as clearly illustrated in Fig. 1. The internal threads of the collar engage the threads of the end 15 of the hub, and its external threads are provided for the attachment of a conical friction-ring 27, preferably made of indurated fiber or equivalent material and internally threaded to fit upon the collar 16.

The cap 14, which fits upon the threaded end $2^\times$ of the axle, is provided with an annular inclined flange 28, extending over the flange 25 of the collar 16 and shouldered at the point 29 to permit a limited play of the hub and to effect the contact of the cap 14 with the friction-ring 27.

The forks of the vehicle-frame (not shown) are secured to the ends of the axle 1 and held by jam-nuts. The outer face of the cap 14 is provided with a squared projection 30, which is embraced by one of the forks of the frame, and upon the threaded end $2^\times$ of the axle is secured the mounting-step of the machine.

To secure the balls 8 in place at the right-hand end of the axle, I provide a threaded ring 31, which screws into the collar 16, and a threaded dust-guard ring 32 may be secured within the collar 16 outside of the ring 31, Fig. 1.

The operation of the mechanism above described is as follows: The forward rotary movement of the hub, which is interlocked with the spiral teeth of the brake-sleeve, as above explained, permits the free rotation of the friction-ring 27 within the cam 14; but a backward rotation of the sprocket caused by back-pedaling at once forces the teeth 19 to move along the spiral slots of the hub and forces the hub laterally in the direction of the arrow in Fig. 1, with the result of forcing the friction-ring 27 firmly against the beveled flange of the cap 14 to arrest the rotation of the wheel.

The construction illustrated in Figs. 10, 11, 12, and 14 differs from that already described in the location of the flange 20 at the outer end of the sleeve 6 and in forming said flange without the slots 18 required in the construction shown in Fig. 2. Again, instead of extending the flange 28 of the cap 14 over the flange 25 of the collar 16 I provide said flange 25 with a horizontal extension $25^a$, which extends over the edge of the flange 25.

It is obvious that the extent of movement of the hub may be nicely adjusted to effect a gradual stopping or slowing of the rotation of the wheel.

Having thus described my invention, what I desire to claim and secure by Letters Patent is—

1. In a bicycle or like vehicle, the combination with a wheel-hub provided at one end with spirally-disposed slots, of a sleeve within the hub enlarged at one end and provided with spiral teeth coöperating with the slots in the hub, and threaded to receive the sprocket-wheel, opposing friction devices on the hub and axle, and means for driving the sleeve.

2. In a bicycle or like vehicle, the combination with the spirally-slotted hub, and a toothed sleeve provided with spirally-disposed teeth, of an internally and externally threaded and flanged collar secured upon the threaded end of the hub, a friction-ring secured upon the collar between the external threads and laterally-projecting flange, and a cap secured upon the axle and provided with a flange adapted to clamp the periphery of said friction-ring.

In testimony whereof I affix my signature in presence of two witnesses.

ALEXANDER P. MORROW.

Witnesses:
   Ross M. Lovell,
   C. A. White.